(12) United States Patent
Hofmann et al.

(10) Patent No.: US 6,938,532 B2
(45) Date of Patent: Sep. 6, 2005

(54) HAND MACHINE TOOL COMPRISING TWO CUTTING DISKS, WHICH ROTATE COUNTER AND IMMEDIATELY ADJACENT TO ONE ANOTHER, AND MEANS FOR CHUCKING THE CUTTING DISKS FOR A HAND MACHINE TOOL OF THIS TYPE

(75) Inventors: Albrecht Hofmann, Steinbronn (DE); Harald Krondorfer, Ludwigsburg (DE); Thomas Schomisch, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/182,512

(22) PCT Filed: Sep. 7, 2001

(86) PCT No.: PCT/DE01/03447
§ 371 (c)(1),
(2), (4) Date: Jul. 31, 2002

(87) PCT Pub. No.: WO02/43910
PCT Pub. Date: Jun. 6, 2002

(65) Prior Publication Data
US 2003/0000717 A1 Jan. 2, 2003

(30) Foreign Application Priority Data
Dec. 2, 2000 (DE) .......................................... 100 59 976

(51) Int. Cl.$^7$ ................................................. B27B 5/32
(52) U.S. Cl. ..................................... 83/698.41; 83/666
(58) Field of Search .......................... 83/698.11, 698.31, 83/698.41, 698.51, 666; 30/276, 388; 173/132, 213, 216, 217; 74/55, 557, 569

(56) References Cited

U.S. PATENT DOCUMENTS 4,597,227 A * 7/1986 Gentischer et al. ......... 451/342
4,909,113 A * 3/1990 Ischenko et al. ......... 83/698.41
5,022,188 A * 6/1991 Borst .......................... 451/358
5,157,873 A * 10/1992 Rudolf et al. .................. 83/666

FOREIGN PATENT DOCUMENTS

| DE | 3523746 | * | 1/1987 |
| DE | 298 04 220 U1 | | 7/1999 |
| DE | 298 13 230 U | | 11/1999 |
| DE | 298 20 693 U | | 3/2000 |
| FR | 2 192 483 A | | 2/1974 |
| WO | 99 41044 A | | 8/1999 |

OTHER PUBLICATIONS

Patent Abstracts of Japan vol. 1998, No. 10, Aug. 31, 1998 & JP 10 118838 A, May 12, 1998.

* cited by examiner

*Primary Examiner*—Stephen Choi
(74) *Attorney, Agent, or Firm*—Michael J. Striker

(57) ABSTRACT

In a power tool with two cutting wheels (11, 12), which rotate past each other in opposite directions, rest directly against each other, and can be driven by two drive spindles (14, 15) disposed concentrically to each other, and with a tool fitting (13) for the cutting wheels (11, 12) that has a support flange (18, 24), which is non-rotatably connected to the respective inner or outer drive spindle and provides a centered support and form-fitting rotary slaving for the cutting wheels (11, 12), and has clamping means for securing the form-fitting engagement between the cutting wheels (11, 12) and the support flanges (18, 24), in order to produce a simple design of the tool fitting (13), with a high operational reliability and a low space requirement, as well as tool-free changing of the cutting wheels, the clamping means have a screw part (27), which supports the second support flange (24) and whose end can be screwed without tools into the inner drive spindle (15), and have a clamping part, which can be actuated without tools, presses the second support flange (24) axially against the inner drive spindle (15), and clamps the second support flange (24) in relation to the screw part (27) (FIG. 1).

12 Claims, 3 Drawing Sheets

HAND MACHINE TOOL COMPRISING TWO CUTTING DISKS, WHICH ROTATE COUNTER AND IMMEDIATELY ADJACENT TO ONE ANOTHER, AND MEANS FOR CHUCKING THE CUTTING DISKS FOR A HAND MACHINE TOOL OF THIS TYPE

BACKGROUND OF THE INVENTION

The invention is based on a power tool with two cutting wheels, in particular a circular saw blades, which rotate past each other in opposite directions and rest directly against each other.

In a known power tool of this type (DE 298 04 220 U1), the form-fitting rotary slaving of the cutting wheels by the support flange of the power tool is assured by means of a bayonet system, which for each cutting wheel, has three keyhole-like securing openings spaced apart at regular angular intervals in the surface of the wheel and for each support flange, has three securing elements, which protrude from the support flange spaced at regular circumference angle intervals and have a securing section shaped like a countersunk head. The clamping means have compression springs on the securing elements, which springs are supported between the support flange and the securing elements that move axially in relation to the support flange. Each cutting wheel is placed against the respective support flange in such a way that the larger diameter part of the three securing openings slides over the countersunk head-like securing sections of the securing elements and is then rotated in relation to the support flange in the working rotation direction of the cutting wheel, causing the narrower part of the securing openings to slide underneath the countersunk head-like securing sections and the cutting wheel to be pressed against the securing section by the compression spring.

A bayonet system of this kind does in fact permit a tool-free mounting of the cutting wheels, but is sensitive to contamination, e.g. by metal cuttings generated in the sawing process. In addition, this tool fitting requires a large amount of space in the axial direction, which can only be made possible by reducing the distances between bearings on the drive spindles. But this means that a lower stability and a higher bearing load must be taken into account.

SUMMARY OF THE INVENTION

The power tool according to the invention has the advantage of a simple design of the tool fitting with a high operational reliability and a low space requirement in which the cutting wheels can be changed without tools. After the one cutting wheel is placed against the first support flange connected to the outer drive spindle, the second cutting wheel is placed against the first cutting wheel and then the other support flange is placed against it, which centers the second cutting wheel and produces the form fit for its rotary slaving. Then, the screw part is manually screwed hand-tight into the inner drive spindle, the second support flange being supported axially against the inner drive spindle. Now the clamping part is manually activated, which exerts an increased axial contact force against the second support flange and thereby clamps the screw part in the thread of the inner drive spindle, which assures a vibration-proof, operationally reliable screw connection.

According to an advantageous embodiment of the invention, a threaded bolt loosely supporting a clamping plate is used as the screw part and the clamping part is a clamping lever, which is affixed to the end of the screw part by means of a pivot pin and has an eccentric cam that is formed onto it and is preferably of one piece with it. The eccentric cam is formed so that when the clamping lever is pivoted out of a position that lies in the plane of the threaded bolt axis, it comes into contact with the clamping plate supported against the second support flange. This structural design has the advantage that the clamping lever is used for two functions. In its position protruding at right angles from the support flange, it serves as a handle for screwing in the threaded bolt, and in its contact position pivoted against the support flange, it exerts a clamping force that is strong enough to reliably prevent the tool fitting from releasing during operation of the power tool.

According to an advantageous embodiment of the invention, a disc spring is disposed between the clamping plate and the second support flange and compensates for axial tolerances during clamping.

According to a preferred embodiment of the invention, the clamping lever has a semicircular contour whose diameter is smaller than the outer diameter of the second support flange. On the one hand, this assures that the clamping lever pivoted against the outside of the support flange remains inside the contour of the flange and on the other hand, when in an upright position, in which it extends along the axis of the threaded bolt, can be easily grasped like a thumb screw and the threaded bolt can therefore be tightened in an ergonomically favorable manner.

According to an advantageous embodiment of the invention, the second support flange, on its outer surface oriented toward the clamping lever, has a concentric protective collar, which protrudes beyond the clamping lever resting against the outer surface and whose diameter is greater than the diameter of the semicircular contour of the clamping lever. This protective collar is recessed in at least two diametrically opposed positions, so as to permit the clamping lever, which is folded over against the outer surface, to be easily grasped. Preferably, the protective collar is comprised of individual humps, which are spaced apart from one another so that enough space remains between the humps to permit access to the clamping lever. When the power tool is set down, this protective collar, which protrudes slightly beyond the folded-over clamping lever, protects the folded clamping lever, which is rotating along with the inner drive spindle that is still coasting to a stop, from striking the support surface or being otherwise damaged.

According to an alternative embodiment of the invention, the clamping plate is embodied as an asymmetrical deep-drawn part with a raised semicircular area, which covers the flange surface not occupied by the clamping lever pivoted against the outer surface of the support flange, flush with this pivoted clamping lever. In addition to protecting the clamping lever when the power tool is set down on a support surface while its cutting wheels are still rotating, such a design also protects the clamping lever from objects striking the rotating tool fitting from an axial direction; these objects instead strike against the semicircular surface and therefore cannot catch on the rotating clamping lever.

According to an advantageous embodiment of the invention, the eccentric cam has two flat clamping surfaces offset from each other by a circumference angle of approximately 90°, which are embodied so that the eccentric cam permits the clamping plate to be engaged by the clamping lever in a stable detent fashion in its position aligned along the axis of the threaded bolt and in its pivoted position resting against the outer surface of the support flange so that these two operating positions of the clamping lever are exactly defined and can only be [overridden] through the exertion of force.

According to an advantageous embodiment of the invention, a radial bearing is fastened between the inner drive spindle and the inner cup wall of a bearing cup, which is affixed to the outer drive spindle and supports the first support flange, and the inner drive spindle rests with a contact shoulder against this radial bearing. This fixes the reciprocal axial spacing of the two drive spindles and the two support flanges and defines the axial gap between the two cutting wheels rotating in opposite directions.

BRIEF DESCRIPTION OF THE DRAWINGS

The invention will be explained in detail in the following description in conjunction with exemplary embodiments shown in the drawings.

DESCRIPTION OF THE PREFERRED EMBODIMENTS

Figure 1:
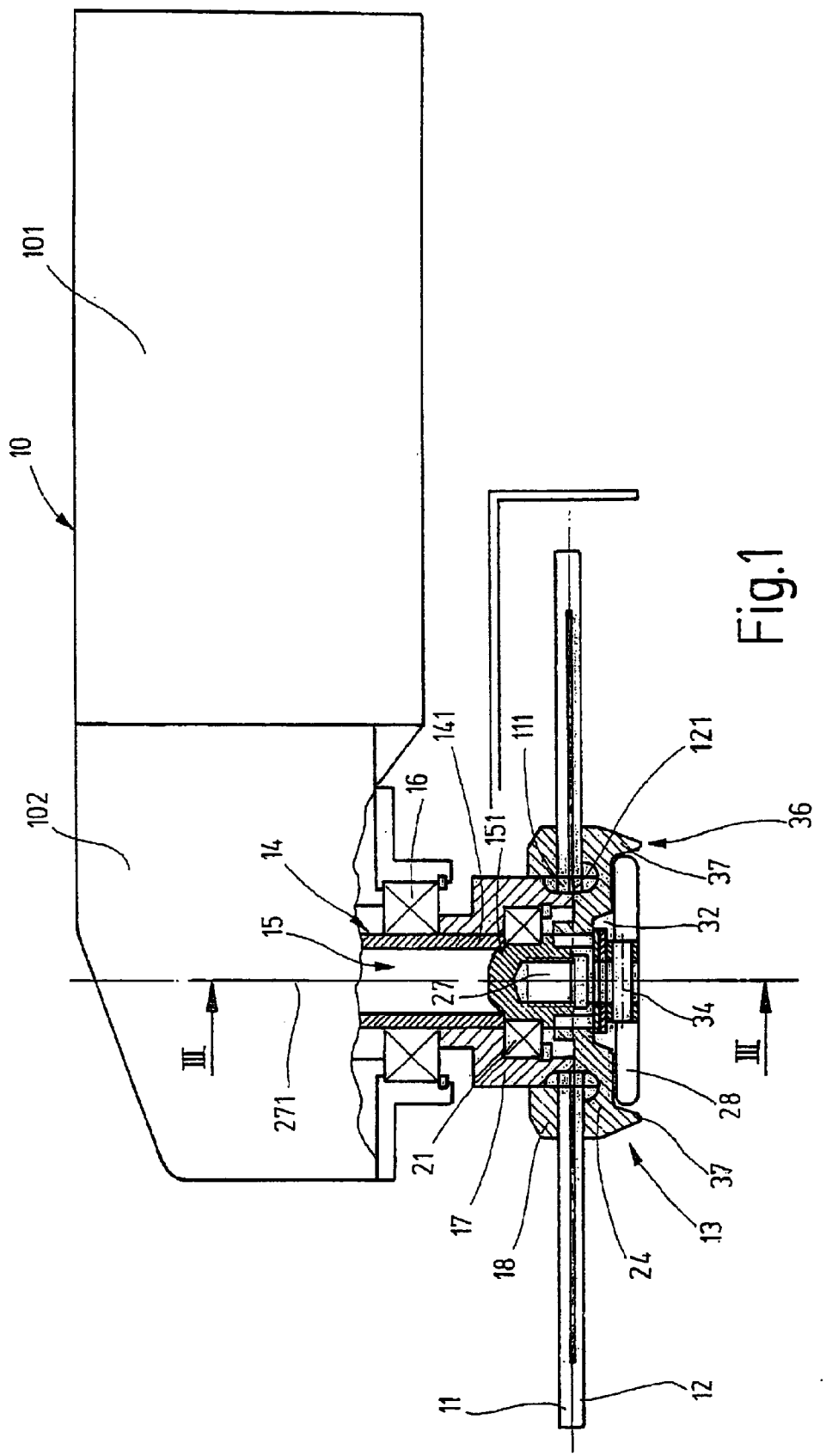
FIG. 1 shows a partially schematic side view of a power tool with two cutting wheels that rotate in opposite directions, with a sectional view in the vicinity of a tool fitting for the cutting wheels.

The power tool, which has two cutting wheels 11, 12 rotating past each other in opposite directions and resting against each other and is shown in a detailed longitudinal sectional view in FIG. 1, has a machine housing 10, which is subdivided into a motor housing 101 and a transmission housing 102 that is flange-mounted to the motor housing. The motor housing 101 contains an electric motor, which drives the cutting wheels 11, 12 and whose driven shaft extends in the direction of the longitudinal axis of the housing, and the transmission housing 102 contains an angular gear mechanism 14, which transmits the rotational movement of the driven shaft to the cutting wheels 11, 12, whose wheel axes are aligned at right angles to the axis of the driven shaft, in such a way that the two cutting wheels 11, 12 rotate in opposite directions. In the exemplary embodiment of FIG. 1, the power tool is embodied as a hand saw and the cutting wheels 11, 12 are comprised of two circular saw blades. In order to use the power tool as a disc grinder, grinding wheels of the kind commonly used in right angle grinders are used as the cutting wheels 11, 12.

Each cutting wheel 11, 12 is non-rotatably connected by means of a tool fitting 13 to one of two concentrically disposed drive spindles 14, 15. The hollow outer drive spindle 14 is supported inside the transmission housing 102 in two radial bearings that are spaced apart from each other, of which only the lower radial bearing 16 is shown in FIG. 1, while the inner drive spindle 15 is supported against the outer drive spindle 14 by means of radial bearings. The ends of the two drive spindles 14, 15 protrude out from the transmission housing 102. The tool fitting 13 for the cutting wheels 11, 12 is mounted on the protruding ends 141 and 151.

The tool fitting 13 has a bearing cup 17, which is non-rotatably supported, e.g. by means of a press fit, on the protruding end 141 of the outer drive spindle 14 and which is provided with a first support flange 18 and, on its end, is provided with a centering collar 19 for receiving the cutting wheel 11, and is provided with a gearing 20. The centering collar 19 and gearing 20 are clearly shown in the enlarged depiction of FIG. 4. When a cutting wheel 11 is placed against the support flange 18, the gearing 20 engages in a circumferential gearing 111 (FIG. 1) embodied in the cutting wheel 11, concentric to the wheel axis, so that as it rotates, the bearing cup 17 driven by the drive spindle 14 carries the cutting wheel 11 along with it in a form-fitting, slaving manner. A radial bearing 21, which rests against the cup bottom, is fastened between the inner drive spindle 15 and the inner cup wall of the bearing cup 17 and the inner drive spindle 15 rests against this radial bearing 21 by means of an annular contact shoulder 152. The radial bearing 21 is fastened in the bearing cup 17 by means of a press fit or—as shown clearly in FIG. 4—by means of a securing ring 23, which rests in an annular groove 22 in the inner cup wall and overlaps the radial bearing 21. The radial bearing 21 simultaneously produces a direct axial fixing of the two drive spindles 14, 15 in relation to each other.

The tool fitting 13 also has a second support flange 24, which can be clamped in relation to the inner drive spindle 15 by clamping means; at the same time, the cutting wheel 12 holds the cutting wheel 11 in form-fitting engagement with the first support flange 18. On its inner surface oriented toward the first support flange 18, the second support flange 24 has a gearing 26, which cooperates with a gearing 121 (FIG. 1) embodied on the wheel surface of the cutting wheel 12, concentric to the wheel axis, to produce the form-fitting rotary slaving of the cutting wheel 12 by means of the second support flange 24 and, with its outer contour, centers the cutting wheel 12. In addition, between the second support flange 24 and the protruding end 151 of the inner drive spindle 15, a profiled gearing 39 is provided, which assures a rotary slaving of the second support flange 24 by means of the inner drive spindle 15. The second support flange 24 is supported at the bottom of the profiled gearing 39, axially against a radial shoulder 125 embodied on the inner drive spindle 15.

The clamping means have a threaded bolt 27, a clamping lever 28 pivotably affixed to the bolt head, a clamping plate 29 disposed concentric to the threaded bolt 27, and a disc spring 30 disposed between the clamping plate 29 and the outer surface of the second support flange 24 oriented away from the cutting wheel 11. The threaded bolt 24 can be screwed with its threaded section into an internal threaded bore 31 in the inner drive spindle 15, which bore is cut into the inner drive spindle 15 from the end. The threaded bolt 27 is inserted through a central opening 33 in the second support flange 24, which opening is disposed coaxially inside a recess 32 in the outer flange surface of the second support flange 24 oriented away from the cutting wheel 12. When the threaded bolt 27 is inserted through the central opening 33, the recess 32 accommodates the disc spring 30 and the clamping plate 29, with the disc spring 30 resting against the bottom of the recess 32. The clamping lever 28 is pivotably supported on the threaded bolt 27 by means of a pin 34, which passes through the bolt head of the threaded bolt 27. The clamping lever 28 has a semicircular contour (FIG. 2), whose diameter is smaller than the outer diameter of the second support flange 24. This semicircular form assures that when pivoted against the outer flange surface, the clamping lever 28 lies inside the contour of the clamping flange 24. As shown particularly in FIG. 4, an eccentric cam 35 is embodied on the clamping lever 28 and is preferably of one piece with the clamping lever 28. The eccentric cam 35 disposed close to the pin 34 is shaped so that when the clamping lever 28 pivoted out of a position pointing in the direction of the threaded bolt axis 272, the cam comes into contact with the clamping plate 29 and exerts a contact force against it.

In order to insert the cutting wheels 11, 12 into the tool fitting 13, first the cutting wheel 11 is placed against the first support flange 18, where it is centered by the centering collar 19. Then the second cutting wheel 12 is placed against the first cutting wheel 11 and the second support flange 24 is placed against it. With the outer contour of its profiled gearing 26, the second support flange 24 centers the second cutting wheel 12 and with the profiled gearing 26, engages in detent fashion with the gearing 121 of the cutting wheel 12, and with the part of the profiled gearing 39 embodied on it, is slid onto the part of the profiled gearing 39 embodied on the inner drive spindle 15. Now the threaded bolt 27 supporting the clamping plate 29 and the disc spring 30 is inserted through the central opening 33 in the second support flange 24 and is manually screwed into the internal thread 31 in the inner drive spindle 15; in its position shown in FIG. 4, the clamping lever 28 serves as a handle. The threaded bolt 27 is screwed hand-tight into the internal thread 15, which presses the second support flange 24 at the bottom of the profiled gearing 39 axially against the inner drive spindle 15. Since the hand-tight screwing-in is not sufficient to assure a vibration-proof, operationally reliable screw connection, the clamping lever 28 is then folded flat against the outer surface of the second support flange 24, its eccentric cam 35, by means of the clamping plate 29 and the disc spring 30, clamping the second support flange 18 in relation to the threaded bolt 27 and thereby clamping it in relation to the inner drive spindle 15.

Figure 3:
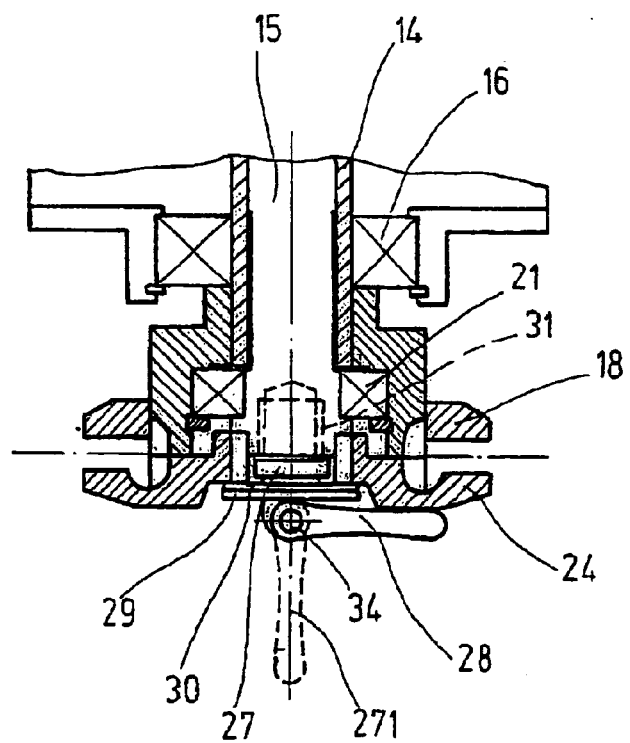
FIG. 3 shows a partially schematic detail of a section along the line III—III in FIG. 1, with the cutting wheels removed.
Figure 4:
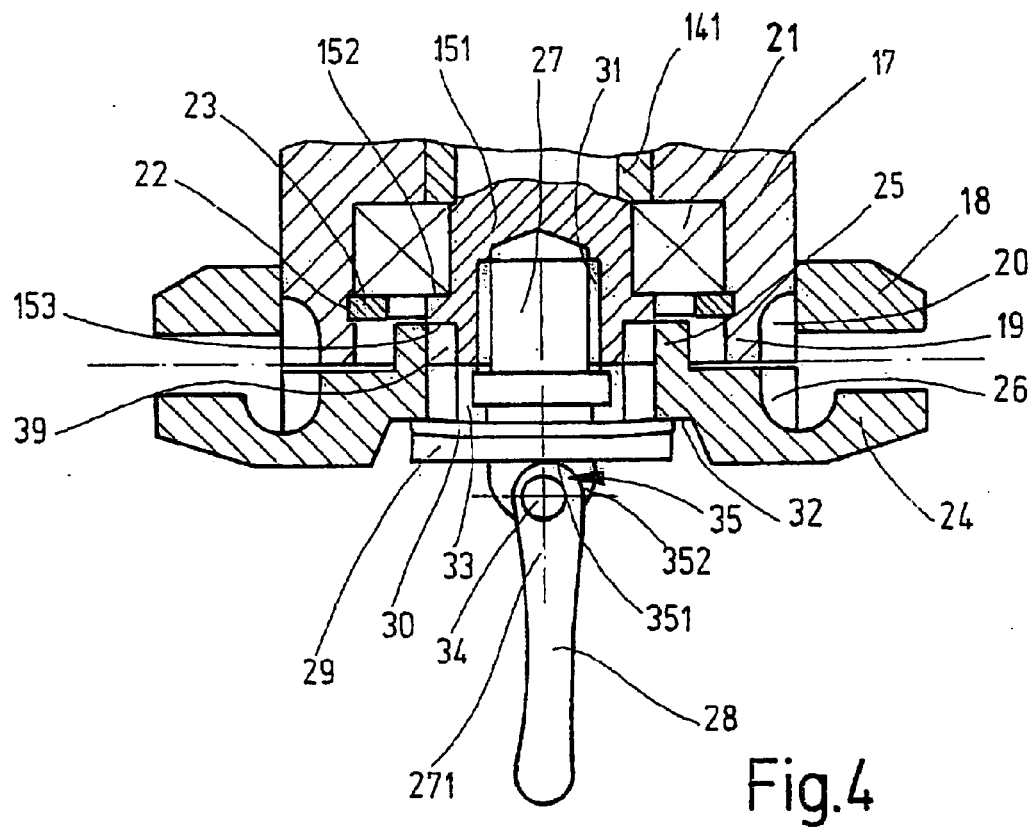
FIG. 4 shows a partially schematic enlarged depiction of the sectional view of the tool fitting in FIG. 3.

As shown in FIG. 4, the eccentric cam 35 has two flat clamping surfaces 351, 352 offset from each other by approximately 90°, which are embodied so that by means of each of these clamping surfaces 351, 352, the clamping lever 28 respectively engages the clamping plate 29 in detent fashion in its pivot positions depicted with solid lines in FIGS. 3 and 4, the detent moment being strong enough that the clamping lever 28 can only be pivoted out of the detent position through a definite exertion of force. As a result, the clamping lever 28 is reliably secured in the respective pivot position and cannot independently pivot away from the support flange 24 even during operation of the power tool.

Figure 2:
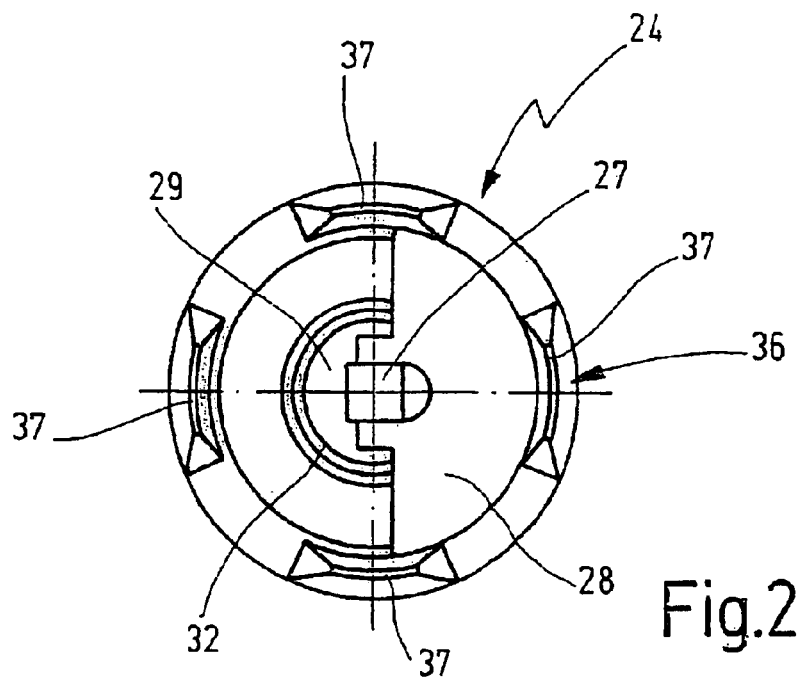
FIG. 2 shows a partially schematic top view of the outer support flange of the tool fitting in FIG. 2.

In the event that the power tool is set down on a support surface while the cutting wheels 11, 12 are still coasting to a stop, in order to protect the clamping lever 28 that is still rotating along with the inner drive spindle 15, a concentric protective collar 36 is provided on the outer flange surface of the second support flange 24 and its diameter is selected to be greater than the diameter of the semicircular clamping lever 28 pivoted against the outer flange surface. This protective collar 36 is recessed in at least two diametrically opposed positions, so as to permit the folded-over clamping lever 28 to be easily grasped by reaching through the protective collar 36. In the exemplary embodiment of the power tool described, as shown in FIG. 2, this protective collar 36 is comprised of a number of humps 37, four in this instance, which are spaced uniformly apart from one another. The protective collar 36 or the humps 37, as shown in FIG. 1, protrude slightly beyond the clamping lever 28, which is pivoted against the outer flange surface of the second support flange 24, so that when the power tool is set down on a support surface in the vicinity of the tool fitting, this protective collar 36 or the humps 37 rest against the support surface; the clamping lever 28, which is pivoted against the support flange 24, can continue to rotate underneath with no hindrance.

Figure 5:
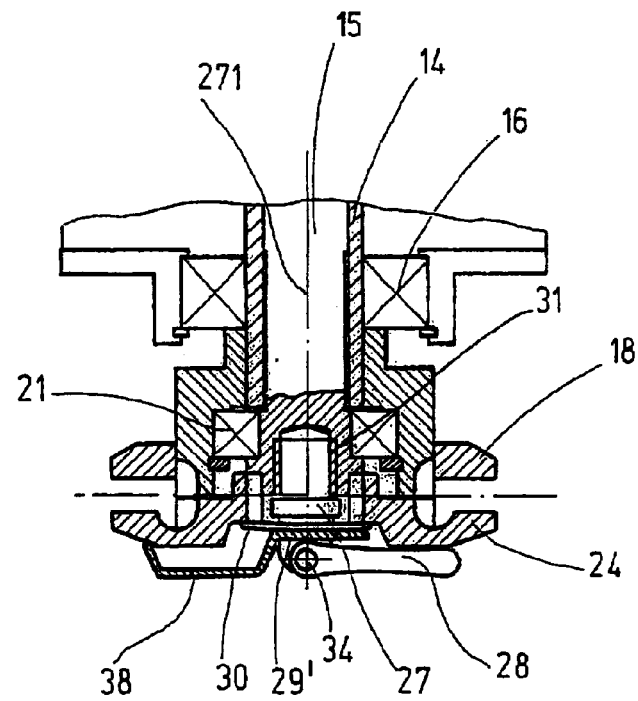
FIG. 5 shows a depiction similar to the one in FIG. 3, but with a modified tool fitting.

FIG. 5 shows a modification of the tool fitting 13. In this instance, the clamping plate 29' is also FIG. 5 shows a modification of the tool fitting 13. In this instance, the clamping plate 29' is also embodied as an asymmetrical deep-drawn part with a raised semicircular area 38. Before the tool fitting 13 is clamped, the clamping plate 29' is placed against the outer surface of the second support flange 24 so that the raised semicircular area 38 covers the flange surface not occupied by the clamping lever 28 pivoted against the outer flange surface. This assures that the rotating clamping lever 28 cannot catch on an object that strikes the rotating clamping lever 28 from an axial direction. This also reduces the risk of injury to a user who inadvertently touches the surface of the clamping lever 28 while the power tool is running, since the folded-over clamping lever 28 constitutes an approximately flat surface together with the raised semicircular area 38 due to the shaping of the clamping plate 29.

What is claimed is:

1. A power tool with two cutting wheels (11, 12), which rotate past each other in opposite directions and rest directly against each other, which are driveable by two drive spindles (14, 15) disposed concentrically to each other, and with a tool fitting (13) for the cutting wheels (11, 12), which has a first support flange (18) non-rotatably connected to the hollow outer drive spindle (14) and a second support flange (24) that is non-rotatably connected to the inner drive spindle (15), which provide a centered support and a form-fitting rotary slaving for the cutting wheels (11, 12), and has clamping means for securing the form-fitting engagement between the cutting wheels (11, 12) and the support flanges (18, 24), wherein said clamping means have a screw part, which supports the second support flange (24) and whose end is screwable directly by hand without tools into the inner drive spindle (15), and have a clamping part, which is actuatable by hand, presses the second support flange (24) axially against the inner drive spindle (15), and clamps the second support flange (24) in relation to the screw part, and wherein the screw part has a threaded bolt (27) loosely supporting a clamping plate (29), and the clamping part is a clamping lever (28), said clamping lever (28) being pivotably affixed to threaded bolt (27) and said clamping lever (28) having an eccentric cam (35) formed onto said clamping lever (28), said eccentric cam (35) being formed so that when the clamping lever (28) is pivoted out of a position pointing in the direction of the threaded bolt axis (271), the eccentric cam (35) comes into contact with the clamping plate (29) supported on the second support flange (24).

2. The power tool according to claim 1, wherein a disc spring (30) is disposed between clamping plate (29) and the second support flange (24).

3. The power tool according to claim 1, wherein the clamping lever (28) has a semicircular contour whose diameter is smaller than the outer diameter of the second support flange (24).

4. The power tool according to claim 3, wherein a second support flange (24), on its outer surface oriented toward the clamping lever (28), has a concentric protective collar (36), which protrudes beyond the clamping lever (28) resting against the outer surface and whose diameter is greater than the diameter of the semicircular contour of the clamping lever (28), and is recessed in at least two diametrically opposed positions.

5. The power tool according to claim 4, wherein said protective collar (36) is subdivided into individual humps (37), which are spaced apart from one another.

6. The power tool according to claims 1, wherein the eccentric cam (35) has two flat clamping surfaces (351, 352) offset from each other by a circumference angle of approximately 90°, which are embodied so that by means of the eccentric cam (35), the clamping lever (28) respectively engages the clamping plate (29, 29') in detent fashion in its screwing position aligned along the threaded bolt axis (271) and in its pivoted position resting against the outer surface of the second support flange (24).

7. The power tool according to claim 1, wherein said eccentric cam (35) is formed onto said clamping lever (28) of one piece with it.

8. The power tool according to claim 1, wherein the two cutting wheels are formed as two circular saw blades.

9. A power tool with two cutting wheels (11, 12), which rotate past each other in opposite directions and rest directly against each other, which are driveable by two drive spindles (14, 15) disposed concentrically to each other, and with a tool fitting (13) for the cutting wheels (11, 12), which has a first support flange (18) non-rotatably connected to the hollow outer drive spindle (14) and a second support flange (24) that is non-rotatably connected to the inner drive spindle (15), which provide a centered support and a form-fitting rotary slaving for these cutting wheels (11, 12) and has clamping means for securing the form-fitting engagement between the cutting wheels (11, 12) and the support flanges (18, 24), wherein said clamping means have a screw part, which support the second support flange (24) and whose end is screwable directly by hand without tools into the inner drive spindle (15), and have a clamping part, which is actuatable by hand, presses the second support flange (24) axially against the inner drive spindle (15), and clamps the second support flange (24) in relation to the screw part, and wherein the second support flange (24), which is supported axially against the inner drive spindle (15), with a part a gearing (39) embodied on it, engages in a form-fitting manner in the part of the gearing (39) embodied on the inner drive spindle (15), and with an additional gearing (26) provided on it, engages in a form-fitting manner in gearing (121) embodied concentrically in the wheel surface of the cutting wheel (12) and simultaneously engages the cutting (12) in a centering fashion.

10. A power tool with two cutting wheels (11, 12), which rotate past each other in opposite directions and rest directly against each other, which are driveable by two drive spindles (14, 15) disposed concentrically to each other, and with a tool fitting (13) for the cutting wheels (11, 12), which has a first support flange (18) non-rotatably connected to the hollow outer drive spindle (14) and a second support flange (24) that is non-rotatably connected to the inner drive spindle (15), which provide a centered support and a form-fitting rotary slaving for these cutting wheels (11, 12) and has clamping means for securing the form-fitting engagement between the cutting wheels (11, 12) and the support flanges (18, 24) wherein said clamping means have a screw part, which supports the second support flange (24) and whose end is screwable directly by hand without tools into the inner drive spindle (15), and have a clamping part, which is actuatable by hand, presses the second support flange (24) axially against the inner drive spindle (15), and clamps the second support flange (24) in relation to the screw part, and wherein the tool fitting (13) has a bearing up (17), which is supported in a non-rotating manner on the free end of the outer drive spindle (14) and on which the first support flange (18) is disposed and, on its end, has a centering collar (19) for revolving the cutting wheel (11), and has a gearing (20), which engages in a form-fitting manner with a gearing (111) embodied concentrically on the wheel surface of a cutting wheel (11).

11. The power tool according to claim 10, wherein a radial bearing (16), which rests against the cup bottom, is fastened between the inner drive spindle (15) and the inner cup wall, and the inner drive spindle (15) rests with a stop shoulder (152) axially against the radial bearing (16).

12. The power tool according to claim 11, wherein said radial bearing (16) is fastened between said inner drive spindle and said inner cup wall by a means selected from the group consisting of a press fit and a securing ring.

* * * * *